United States Patent
Emberson

[11] 3,823,965
[45] July 16, 1974

[54] PIPE JOINT

[76] Inventor: John Ernest Emberson, 25 Dogwood Cres., Scarborough, Ontario, Canada

[22] Filed: Feb. 26, 1973

[21] Appl. No.: 373,741

[52] U.S. Cl. .......................... 285/174, 285/334.5
[51] Int. Cl. ............................................ F16l 55/00
[58] Field of Search ........ 285/174, 238, 334.5, 354, 285/DIG. 16

[56] References Cited
UNITED STATES PATENTS

| | | | |
|---|---|---|---|
| 1,800,753 | 4/1931 | Replogle | 285/334.5 X |
| 2,463,196 | 3/1949 | Parker | 285/334.5 X |
| 3,160,426 | 12/1964 | Faeser | 285/334.5 X |
| 3,245,701 | 4/1966 | Leopold et al | 285/174 |
| 3,334,773 | 8/1967 | Bimba | 285/334.5 X |
| 3,501,171 | 3/1970 | Baron | 285/334.5 X |

Primary Examiner—Alfred R. Guest
Attorney, Agent, or Firm—Ridout & Maybee

[57] ABSTRACT

Metal pipes and plastic pipes are joined together by means of an outwardly flanged metal pipe section and a cylindrical plastic connecting member with an inward flange. The metal flange, on the end of the metal pipe section, is located within the cylindrical body portion of the connecting member, the two flanges co-operating to compress a sealing ring in between, with the body of the metal pipe protruding through the flange on the plastic member. A retaining ring fits snugly within the body portion of the connecting member, bears against the metal flange, and holds the joint in assembled position.

7 Claims, 2 Drawing Figures

PIPE JOINT

FIELD OF THE INVENTION

This invention relates to arrangements for joining together metal pipes and plastic pipes.

GENERAL DESCRIPTION OF THE PRIOR ART

Fluid conveying pipes such as water pipes for use in domestic and industrial buildings have traditionally been of metal, for example lead or copper. On grounds of cost and ease of fabrication, pipes of thermoplastic materials, for example, polyethylene, polypropylene, polystyrene, ABS, polyvinylchloride and the like, are finding increasing usage in such applications, as replacements for expensive metals. However, on account of the different properties of metal and thermoplastics, there are certain applications for which pipes of metal are desirable or mandatory, and certain other applications where pipes of thermoplastic material are desirable or mandatory, in buildings. It is consequently frequently necessary to join together sections of metal pipe and sections of thermoplastic pipe, in a fluid-tight manner.

SUMMARY OF THE INVENTION

An object of the present invention is to provide a means by which such joints may be effected, with a minimum of installation time and equipment.

The pipe joint according to the invention uses simple parts which can readily be prefabricated in the factory, and allows of installation quickly and simply by unskilled or semi-skilled labour. Briefly, the pipe joint according to the invention utilizes a metal pipe section having an outwardly projecting flange, and a plastic connecting member having an inwardly projecting flange, the two flanges cooperating together to enclose a compressible sealing ring which forms a fluid tight seal there-between. The parts are maintained in position by provision of a retaining ring, suitably of plastic, secured within the plastic connecting member in a position to exert pressure to compress the sealing ring. The plastic pipe is then connected to the plastic connecting member, this being a simple plastic-to-plastic connection, means for which are well known. Metal pipe sections can be connected to the flanged metal pipe section forming part of the joint, by means known in the art.

BRIEF DESCRIPTION OF THE DRAWINGS

A specific embodiment of a pipe joint according to the invention is illustrated in the drawings, in which.

DESCRIPTION OF THE PREFERRED EMBODIMENTS

Figure 1:
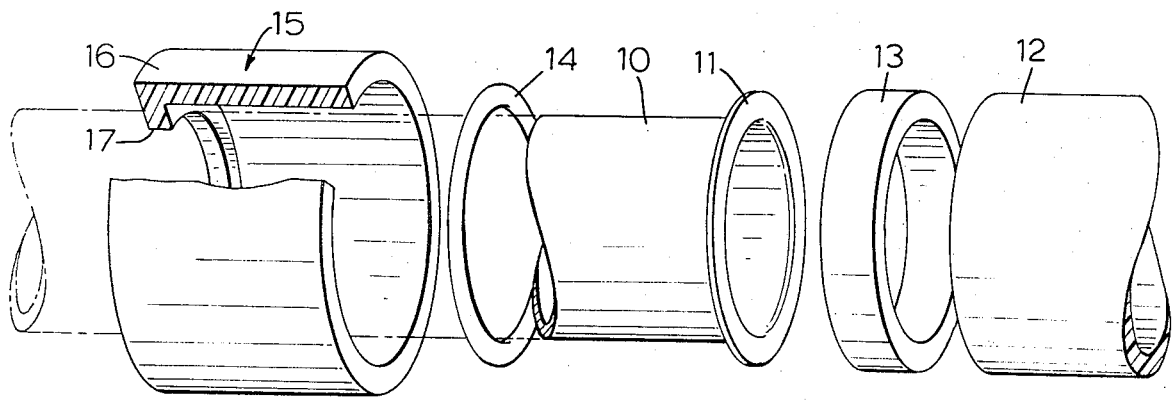
FIG. 1 is a perspective view, partially cut away, of the constituent parts of a pipe joint according to the invention positioned immediately prior to final assembly of the pipe joint.

With reference to FIG. 1, the constituent parts of the pipe joint according to the invention includes a metal pipe section 10 having an outwardly extending peripheral flange 11, at one end. There is also a plastic pipe section 12, the outer diameter of which is substantially the same as the diameter of the flange 11 of the metal pipe section 10. Also included is a retaining ring 13 of generally cylindrical form, and having an outer diameter substantially corresponding to that of the plastic pipe section 12. The retaining ring 13 is made of the same thermoplastic material as the plastic pipe section 12, suitably ABS plastic.

Surrounding the length of the metal pipe section 10 is a sealing ring 14, of compressible material, suitably oil resistant rubber. The sealing ring 14 is dimensioned so as to be a close fit around the length of the pipe section 10.

The parts for making the pipe joint are completed by a plastic connecting member 15, of generally cylindrical form, having a body portion 16 and an inwardly extending peripheral flange 17 located at one end thereof. The connecting member is made of the same plastic as the retaining ring 13 and the plastic pipe section 12. The connecting member 15 surrounds the length of the metal pipe 10. It is dimensioned so that the flange 11 of the metal pipe 10 fits fairly closely within the body portion 16, but abuts against the inwardly extending flange 17 of the plastic connecting member 15. The length of metal pipe 10 extends outwardly through the aperture defined by the inner surface of flange 17, but is a fairly close fit therein.

Figure 2:
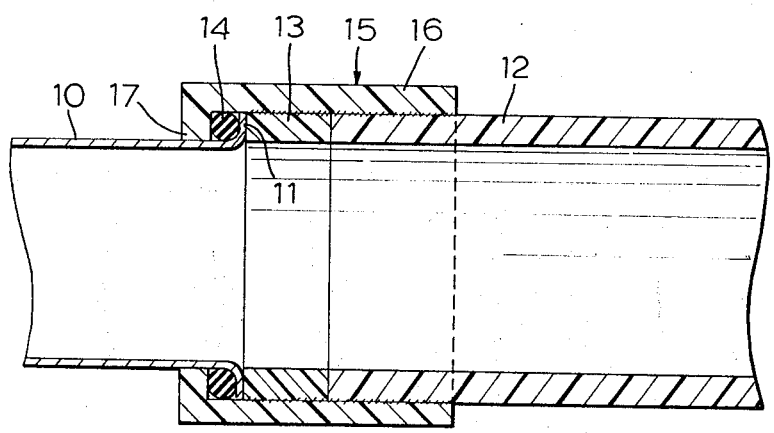
FIG. 2 is a vertical cross sectional view through an assembled pipe joint according to FIG. 1.

Referring now to FIG. 2, this shows, in vertical cross section, the assembled pipe joint, using the parts described in FIG. 1. The compressible sealing ring 14 surrounds the length of the pipe 10, but is also in contact with the side face of the flange 11 of the metal pipe section, and the side face of the flange 17 of the plastic connecting member 15. The retaining ring 13 has been pressed down into the body portion 16 of the connecting member 15, within which it is a close fit, until it presses against the side face of flange 11 of metal pipe section 10. The retaining ring 13 exerts pressure on flange 11, thereby compressing sealing ring 14 between flange 11 of the metal pipe section and flange 17 of the plastic connecting member, and causing the sealing ring 14 to effect liquid seal between the metal pipe section 10 and the connecting member 15. The retaining ring 13 is secured in this position, exerting pressure to compress the sealing ring 14, by solvent bonding the retaining ring to the body portion 16 of the connecting member 15. This is readily achieved by applying a suitable solvent for thermoplastics to the outer surface of retaining ring 13 immediately prior to its insertion into body portion 16, and then holding it in the correct position for a brief period of time, to allow the solvent bond to take effect between the retaining ring 13 and the body portion 16 of the plastic connecting member 15.

The plastic pipe section 12 is positioned so that its end lies within body portion 16 of connection member 15, and abuts against the end face of retaining ring 13. Plastic pipe section 12 is also conveniently solvent bonded to the body portion 16 of connecting member 15 by application of a small amount of plastic solvent to the outer surface of plastic pipe 12 immediately prior to insertion into body portion 16. Then, plastic pipe section 12 is held in position for a brief period to allow the solvent bond to take effect.

It will be appreciated that it is not necessary that a hermetic seal be effected between connecting member 15 and retaining ring 13, or between coupling member 15 and plastic pipe section 12. All that is necessary is that retaining ring 13 be secured by suitable means in the proper position to exert pressure to compress sealing ring 14. This can be accomplished at the factory, prior to delivering the unit for on site installation. Liquid tight sealing is effected by sealing ring 14, between metal pipe section 10 and coupling member 15. Thus, the solvent bonding to retain the retaining ring 13 in position can be effected by unskilled workmen, it only being necessary to form a joint. Provided that the retaining ring is inserted in the right place, and a little pressure is exerted until the solvent bond takes effect, the seal necessary for the joint will be effected.

It will thus be appreciated also that other means can be adopted for positioning the retaining ring 13 and the plastic pipe 12. For example, these plastic parts can be spot welded together at three or four locations around the periphery, e.g. by ultra-sonic welding, spot welding or other simple, convenient means commonly encountered on building sites.

The arrangement as shown according to this invention allows solvent bonding to be adopted, which is commonly the most convenient method, without the risk of plastic solvent coming into contact with the sealing ring 14. This is prevented by the flange 11 on the metal pipe section acting as a barrier to such contamination. Thermoplastic solvents commonly have an adverse effect, over a period of time, on compressible, rubbery sealing materials suitable for use as the sealing ring 14, leading to their slow deterioration, until they are no longer able to function satisfactorily as a liquid seal. The arrangement of the present invention overcomes problems in this direction.

The flange 11 on the pipe section 10 is easily machined onto a piece of metal pipe, especially copper pipe. Satisfactorily smooth surfaces are readily achieved by such a means.

It is in many instances convenient to assemble the metal pipe section 10, sealing ring 14, connecting member 15 and retaining ring 13, including bonding of retaining ring 13 to connecting member 15 at the desired position, at the factory. This assembly is then supplied as a pipe joint unit to the site, where it is installed by simple metal-to-metal and plastic-to-plastic joints, the connection of plastic pipe 12 to connecting member 15 taking place on site. This assembly can be supplied in a variety of different sizes, corresponding to standard pipe sizes currently in common use.

What I claim as my invention is:

1. A pipe joint comprising:
   a metal pipe section having an outwardly extending flange adjacent one end thereof;
   a plastic connecting member of generally cylindrical form, having a body portion and an inwardly projecting flange adjacent one end thereof, the flange of said metal pipe section being located within the body portion of the connecting member, and the length of said metal pipe section protruding through the aperture defined by said inwardly projecting flange;
   a compressible sealing ring located between said flanges effecting liquid seal between said metal pipe section and said connecting member;
   a retaining ring of generally cylindrical form snugly fitted within the body portion of said connecting member, in contact with the flange of said metal pipe; the body portion of said connecting member being adopted to receive therein the end portion of a plastic pipe section.

2. The pipe joint of claim 1 wherein the retaining ring and the plastic pipe section are bonded to said connecting member.

3. The pipe joint of claim 2 wherein the retaining ring and the plastic pipe section are both of the same thermoplastic material as the plastic connecting member.

4. The pipe joint of claim 2 wherein the retaining ring and the plastic pipe section are bonded to said connecting member by spot welding.

5. The pipe joint of claim 2 wherein the retaining ring and the plastic pipe section are bonded to said connecting member by solvent bonding.

6. The pipe joint of claim 1 wherein the retaining ring is positioned to exert pressure on the flange of said metal pipe section, so as to compress the sealing ring.

7. Means for connecting plastic pipe to metal pipe, comprising:
   a metal pipe section having an outwardly extending flange adjacent one end thereof;
   a plastic connecting member of generally cylindrical form having a body portion and an inwardly extending flange adjacent one end thereof, the plastic connecting member being dimensioned so as to allow protrusion of the length of the metal pipe section through the aperture defined by said inwardly extending flange, but to cause abutment of the side face of said outwardly extending flange against the opposed side face of said inwardly extending flange;
   a compressible sealing ring adapted to surround the length of the metal pipe section and contact the opposed side faces of said outwardly extending flange and said inwardly extending flange within the body portion of said plastic connecting member;
   a plastic retaining ring adapted to fit snugly within the body portion of said plastic connecting member and bear against said end of the metal pipe section; the body portion of the plastic connecting member being adapted to receive therein the end portion of a plastic pipe, in abutment with the end face of said plastic retaining member.

\* \* \* \* \*